United States Patent
Kikumoto et al.

(10) Patent No.: US 8,687,215 B2
(45) Date of Patent: Apr. 1, 2014

(54) IMAGE FORMING SYSTEM, INFORMATION MANAGEMENT SERVER, AND COMPUTER READABLE MEDIUM STORING PROGRAM HAVING MULTIPLE AUTHENTICATION UNITS TO CREATE A SECURE PRINTING SYSTEM

(75) Inventors: Takashi Kikumoto, Kanagawa (JP); Masahiko Yajima, Kanagawa, PA (US); Hirokazu Tanaka, Kanagawa (JP); Katsuhito Habaguchi, Kanagawa (JP); Bo Liu, Kanagawa (JP); Masayuki Iwasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 267 days.

(21) Appl. No.: 13/190,054

(22) Filed: Jul. 25, 2011

(65) Prior Publication Data

US 2012/0250066 A1 Oct. 4, 2012

(30) Foreign Application Priority Data

Mar. 29, 2011 (JP) ................................. 2011-072479

(51) Int. Cl.
*G06K 15/00* (2006.01)
*G06F 3/12* (2006.01)

(52) U.S. Cl.
USPC ......................................... 358/1.14; 358/1.15

(58) Field of Classification Search
USPC ............. 358/1.1, 1.9, 1.13, 1.14, 1.15; 726/4, 726/34; 709/201, 203, 219, 229; 399/80
See application file for complete search history.

(56) References Cited

U.S. PATENT DOCUMENTS

| | | | |
|---|---|---|---|
| 7,561,286 B2* | 7/2009 | Suto | 358/1.14 |
| 8,281,992 B2* | 10/2012 | Bando et al. | 235/382.5 |
| 8,433,214 B2* | 4/2013 | Oak | 399/80 |
| 2006/0250633 A1* | 11/2006 | Sugiyama | 358/1.13 |
| 2008/0040817 A1* | 2/2008 | Kawai et al. | 726/34 |
| 2008/0209419 A1 | 8/2008 | Maeda | |
| 2009/0064289 A1* | 3/2009 | Jang | 726/4 |

FOREIGN PATENT DOCUMENTS

| | | |
|---|---|---|
| JP | A-2002-370407 | 12/2002 |
| JP | A-2004-220354 | 8/2004 |
| JP | A-2007-30354 | 2/2007 |
| JP | A-2009-217306 | 9/2009 |

* cited by examiner

*Primary Examiner* — Gabriel Garcia
(74) *Attorney, Agent, or Firm* — Oliff PLC

(57) ABSTRACT

An image forming system includes an information management unit, a determining unit, and at least one image forming unit. The information management unit stores and manages print information. The determining unit determines whether or not execution of a printing process regarding the print information is allowed. Each image forming unit prints and outputs print information acquired from the information management unit on a recording medium in accordance with a determination result of the determining unit. The determining unit includes a first authenticating unit and a second authenticating unit. The first authenticating unit performs authentication to determine whether or not execution of processing before printing and outputting the print information on a recording medium is allowed. The second authenticating unit performs authentication after completion of the authentication performed by the first authenticating unit to determine whether or not printing and output of the print information on the recording medium is allowed.

12 Claims, 10 Drawing Sheets

FIG. 6

```
To : user_A@fujixerox.co.jp
From : printsvr@fujixerox.co.jp
Subject :   NOTIFICATION OF COMPLETION OF
            PREPARING AUTHENTICATION JOB The following print job is now going to be output.

Printer Name                  : PRINTER A
Job name                      : JOB_01
Transmission Completion Time  : 01/20/2011  13:30:50
```

IMAGE FORMING SYSTEM, INFORMATION MANAGEMENT SERVER, AND COMPUTER READABLE MEDIUM STORING PROGRAM HAVING MULTIPLE AUTHENTICATION UNITS TO CREATE A SECURE PRINTING SYSTEM

CROSS-REFERENCE TO RELATED APPLICATIONS

This application is based on and claims priority under 35 USC 119 from Japanese Patent Application No. 2011-072479 filed Mar. 29, 2011.

BACKGROUND (i) Technical Field

The present invention relates to an image forming system, an information management server, and a computer readable medium storing a program.

(ii) Related Art

Recently, secure printing systems (or authentication printing systems) for use with image forming apparatuses such as printers have become increasingly prevalent. In secure printing systems, in order to avoid unwanted errors such as leakage of information due to a printed document being left behind and a printed document gone missing due to a mix-up, user identity authentication may be performed on a printer using an integrated circuit (IC) card or the like and only an authenticated user executes printing.

Roughly two types of secure printing systems are available: "push" and "pull".

Push printing systems are systems in which a printer stores print data and outputs the print data in accordance with authentication on the printer.

Pull printing systems are systems in which a print server stores print data and a printer acquires the print data from the server and outputs the print data in accordance with authentication on the printer.

In general, pull printing systems have an advantage in that they allow a user to select a desired printer as an output device over push printing systems.

SUMMARY

According to an aspect of the invention, there is provided an image forming system including an information management unit, a determining unit, and at least one image forming unit. The information management unit stores and manages print information. The determining unit determines whether or not execution of a printing process regarding the print information is allowed. Each image forming unit prints and outputs print information acquired from the information management unit via a communication unit on a recording medium in accordance with a determination result of the determining unit. The determining unit includes a first authenticating unit and a second authenticating unit. The first authenticating unit performs authentication for the printing process regarding the print information to determine whether or not execution of processing before printing and outputting the print information on a recording medium using an image forming unit among the at least one image forming unit is allowed. The second authenticating unit performs authentication for the printing process regarding the print information, after completion of the authentication performed by the first authenticating unit, to determine whether or not printing and output of the print information on the recording medium using the image forming unit is allowed.

BRIEF DESCRIPTION OF THE DRAWINGS

Exemplary embodiment(s) of the present invention will be described in detail based on the following figures, wherein:

FIG. 6 illustrates an example electronic mail transmitted;

DETAILED DESCRIPTION

Figure 1:
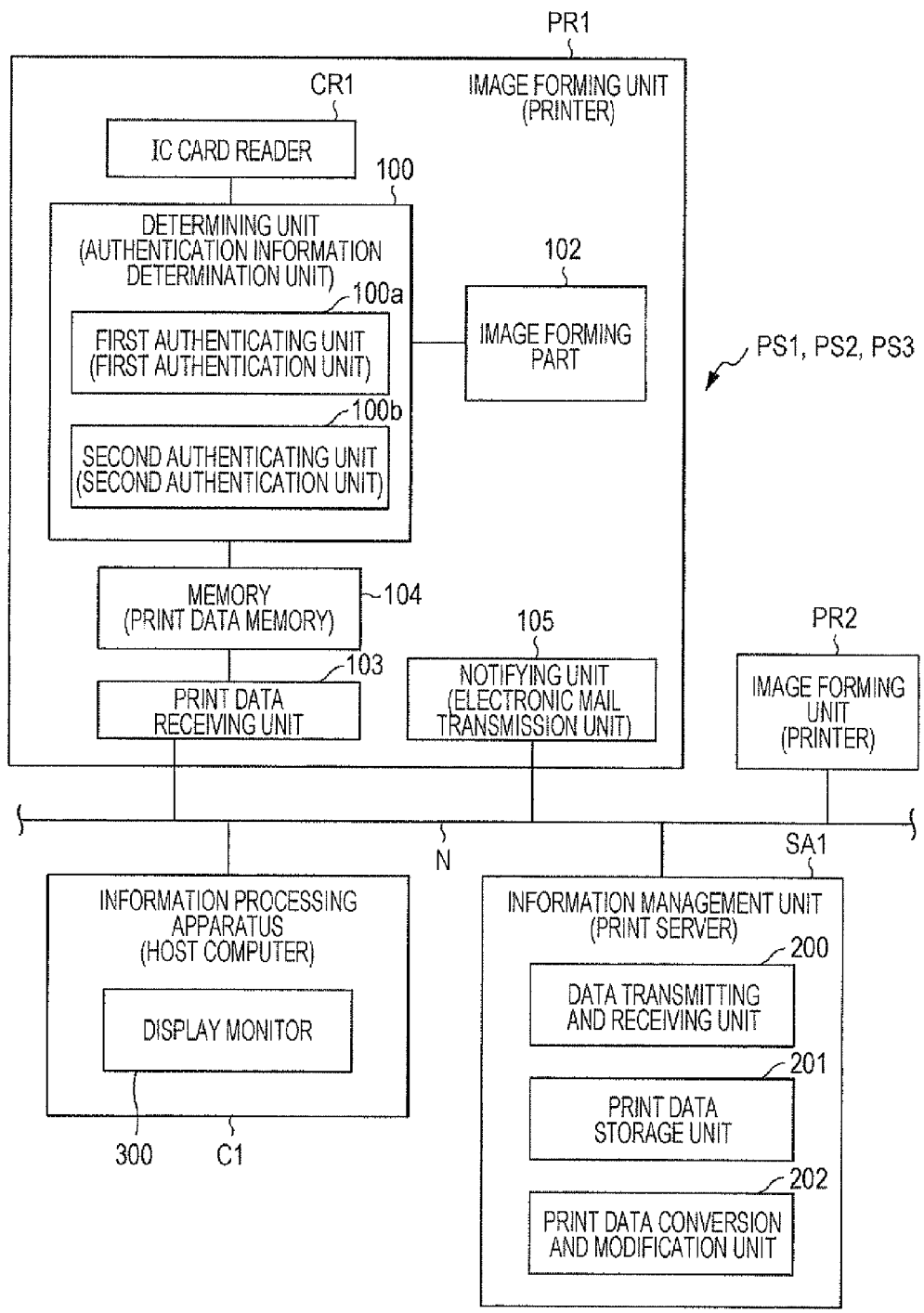
FIG. 1 is a functional block diagram illustrating the functional configuration of an image forming system according to an exemplary embodiment.

Exemplary embodiments of the present invention will be described in detail with reference to the drawings. In the drawings, the same members or substantially the same members are assigned the same numerals, and will not be described redundantly. The exemplary embodiments of the present invention discussed herein are merely illustrative, and the present invention is not intended to be limited to the following exemplary embodiments.

An image forming system PS1 according to a first exemplary embodiment of the present invention will be described with reference to FIGS. 1 to 10.

First, the functional configuration of the image forming system PS1 will be described with reference to FIG. 1.

The image forming system PS1 includes a print server SA1 (an example of an information management unit), two printers PR1 and PR2 (examples of image forming units), and a host computer C1 (an example of an information processing apparatus). The print server SA1 stores and manages print information (print data). Each of the printers PR1 and PR2 acquires print information from the print server SA1 via a network N (an example of a communication unit) such as a local area network (LAN), and prints and outputs the print information on a recording medium such as a sheet of printing paper. The host computer C1 is connected to the print server SA1 and the printers PR1 and PR2 via the network N.

In FIG. 1, two printers are connected, by way of example. However, one printer or more than two printers may be connected.

While only the configuration of the printer PR1 is illustrated in FIG. 1, in this exemplary embodiment, the printer PR2 has a configuration similar to the printer PR1.

However, the printers PR1 and PR2 support different print description languages (PDLs) and job control languages (JCLs).

The printer PR1 includes an authentication information determination unit 100 (an example of a determining unit), and an image forming part 102. The authentication information determination unit 100 determines whether or not a printing process regarding the print information is possible. The image forming part 102 prints and outputs the print data on a recording medium in accordance with a determination result of the authentication information determination unit 100.

The printer PR1 further includes a print data receiving unit 103 and a print data memory 104 (an example of a memory). The print data receiving unit 103 receives print data acquired from the print server SA1 via the network N. The print data memory 104 stores the received print data, and may be, for example, a hard disk device.

The print data memory 104 also stores print data that has been subjected to processing before performing printing and outputting on a recording medium.

The authentication information determination unit 100 includes a first authentication unit 100a (an example of a first authenticating unit) and a second authentication unit 100b (an example of a second authenticating unit). The first authentication unit 100a performs authentication ("first authentication process") for the printing process regarding the print data to determine whether or not execution of the processing before performing printing on a recording medium by using the image forming part 102 is allowed. After the completion of the first authentication process of the first authentication unit 100a, the second authentication unit 100b performs authentication ("second authentication process") for the printing process regarding the print data to determine whether or not printing and output of the print data on a recording medium by using the image forming part 102 is allowed.

In this exemplary embodiment, furthermore, the first authentication unit 100a and the second authentication unit 100b may acquire authentication information by reading authentication data recorded on an IC card using an IC card reader CR1.

The authentication information may be acquired by using any suitable authentication method other than using an IC card, such as biometrics authentication.

The printer PR1 further includes an electronic mail transmission unit 105 (an example of a notifying unit). When the first authentication process of the first authentication unit 100a is completed, the electronic mail transmission unit 105 provides notification of waiting for the print data to be printed and output.

The notifying unit may also provide notification by, instead of using electronic mail, displaying a message or outputting sound.

The term "processing before performing printing and outputting on a recording medium", as used herein, includes a conversion process for converting print data in accordance with the specifications of the printer PR1 or the printer PR2, a modification process for modifying the print data by adding a duplex (or double-side) printing or simplex (or single-side) printing command or a post-processing command to the print data, and a transfer process for transferring the print data from the print server SA1 to the printer PR1 or the printer PR2 via the network N.

The print server SA1 at least includes a data transmitting and receiving unit 200, a print data storage unit 201, and a print data conversion and modification unit 202. The data transmitting and receiving unit 200 transmits and receives various kinds of data including print data to and from the printers PR1 and PR2 and the host computer C1 via the network N. The print data storage unit 201 stores print data received from the host computer C1, and may be, for example, a hard disk device. The print data conversion and modification unit 202 performs the "processing before printing on a recording medium" as described above.

If plural pieces of print data exist, the print server SA1 may transmit information regarding each piece of print data to the host computer C1 or an information processing apparatus such as a personal computer connected to the network N. On the host computer C1 or the information processing apparatus such as a personal computer, the user may select whether or not to perform the second authentication process of the second authentication unit 100b in accordance with information regarding each piece of print data displayed on a display monitor 300 or the like.

Alternatively, if plural pieces of print data exist, the print server SA1 may transmit list information about the plural pieces of print data to the host computer C1 or an information processing apparatus such as a personal computer connected to the network N. The user may select a desired piece of print data requested to be printed and a printer (in this exemplary embodiment, the printer PR1 or PR2) that prints the piece of print data in accordance with the list information displayed on the display monitor 300 or the like by using the host computer C1 or the information processing apparatus such as a personal computer, and may notify the print server SA1 of the selected results via the network N.

Figure 2:
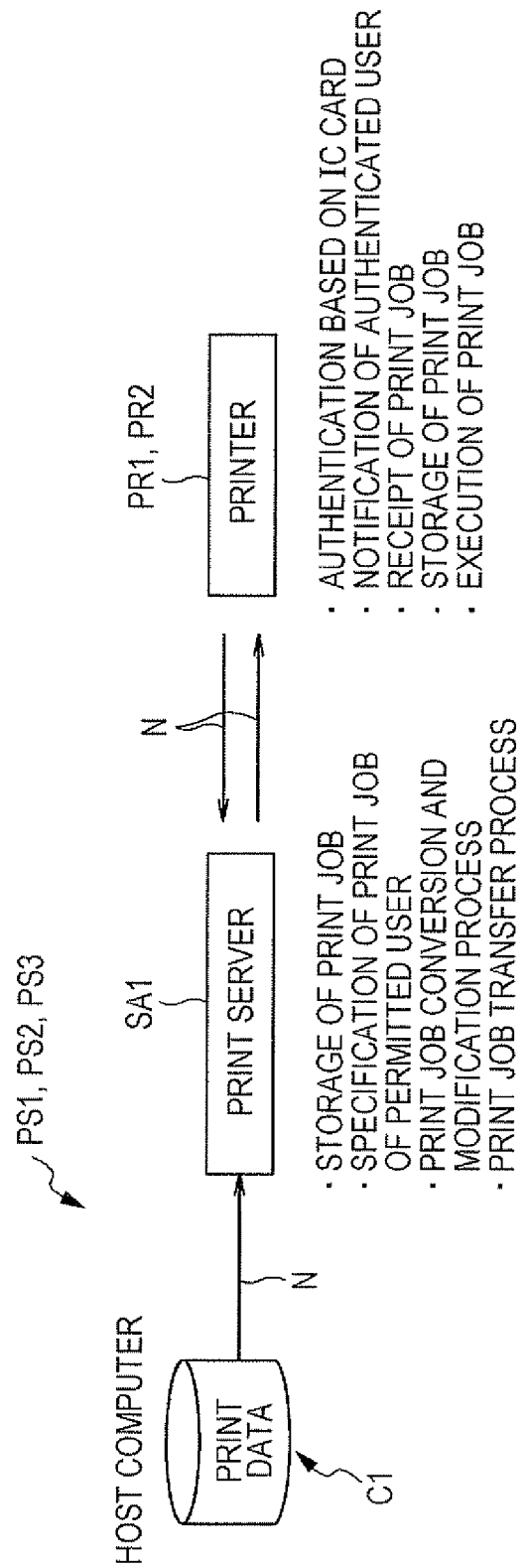
FIG. 2 illustrates an overview of the functions of the image forming system according to the exemplary embodiment.

Next, an overview of the operation or the like of the individual units of the image forming system PS1 will be described with reference to FIG. 2.

The host computer C1 obtains print data by, for example, generating the print data, and transfers the print data to the print server SA1 via the network N.

The print server SA1 stores the print job (print data), specifies a print job of a permitted user, a print job conversion and modification process, and performs a print job transfer process.

The printer PR1 or the printer PR2 performs authentication based on an IC card, sends notification of an authenticated user, receives a print job, stores the print job, and executes the print job.

Figure 3:
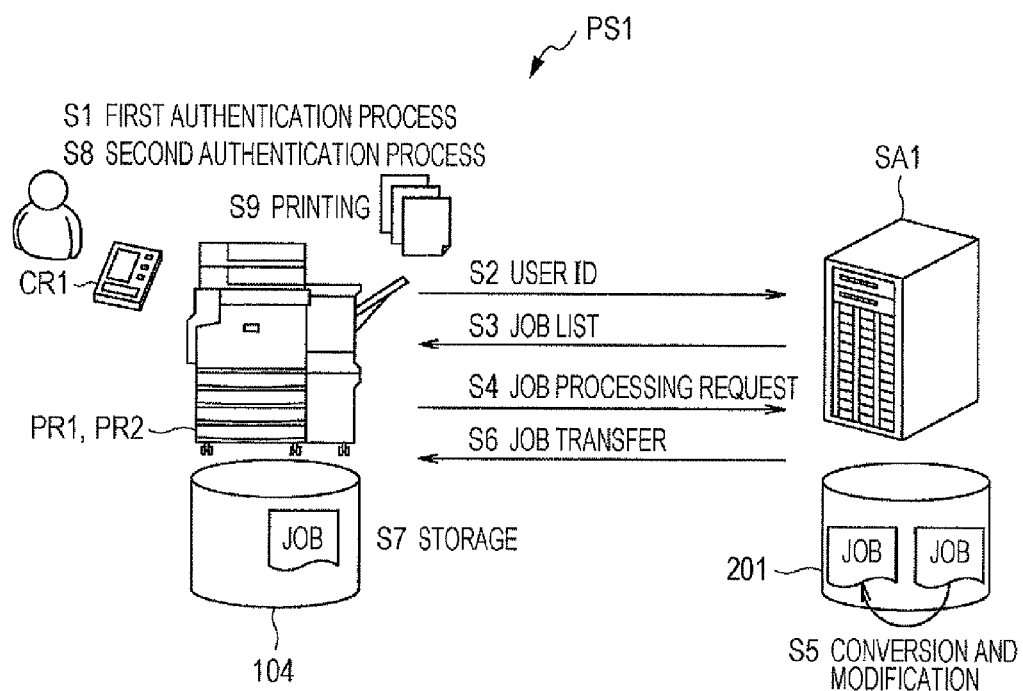
FIG. 3 illustrates the operation of the image forming system according to the exemplary embodiment.

Next, an example of the operation of the image forming system PS1 according to this exemplary embodiment will be described with reference to FIG. 3.

First, in step S1, in the printer PR1 (PR2), the IC card reader CR1 reads information regarding an IC card owned by a user, and the first authentication unit 100a performs the first authentication process.

If the first authentication process has been successful, a user ID is transmitted to the print server SA1 (step S2).

Then, the print server SA1 creates a print job list and transmits data about the print job list to the printer PR1 (PR2) (step S3).

Then, the user selects a desired print job from the print job list displayed on a display panel or the like of the printer PR1 (PR2), and requests the print server SA1 to process the print job (step S4).

Then, the print server SA1 converts the requested print job into a data format supported by the printer PR1 (PR2) to output the print job, and modifies the print job (step S5).

The print server SA1 transfers the print job obtained after the conversion and modification processing to the printer PR1 (PR2) (step S6).

The printer PR1, (PR2) stores the transferred print job in the print data memory 104 as an authentication job of the user (steps S6 and S7).

Then, the IC card reader CR1 again reads the information about the IC card owned by the user, and the second authentication unit 100b performs the second authentication process (step S8).

If the second authentication process has been successful, the printer PR1 (PR2) starts printing and outputting the authentication job of the authenticated user, which is stored in the print data memory 104.

Figure 4:
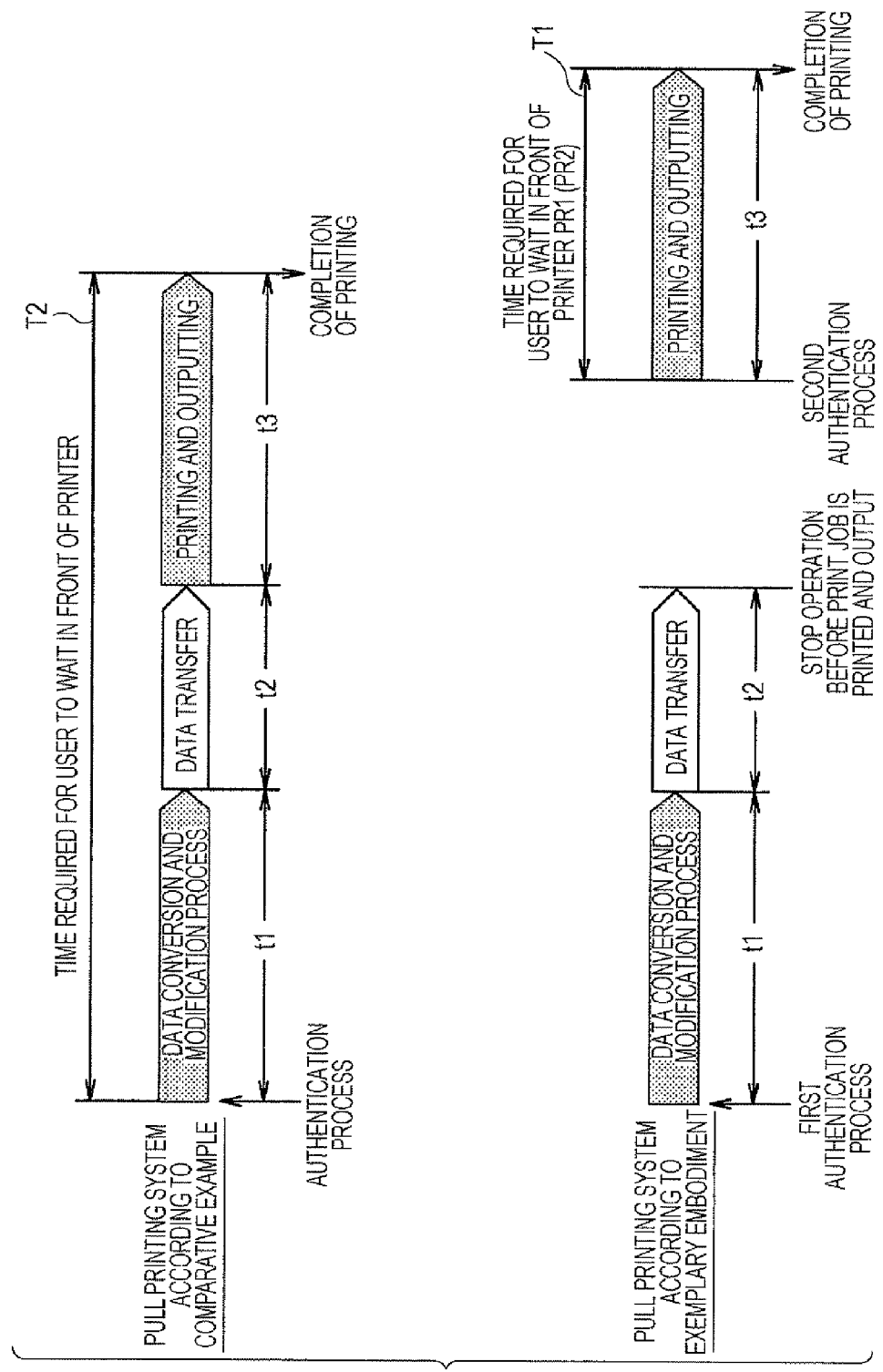
FIG. 4 illustrates comparison between an comparative example and an exemplary embodiment of the present invention.

Referring to FIG. 4, a time T1 during which a user waits in front of a printer in a pull printing system according to an exemplary embodiment is compared with a time T2 during which a user waits in front of a printer in a pull printing system according to a comparative example.

In the pull printing system according to the comparative example, a user may be required to wait in front of a printer until the printer has completed printing of a print job during the time T2 after user authentication. The time T2 is given by (time t1 required for converting the print job into data and for modifying the data) (time t2 required for transferring the data)+(time t3 required for printing and outputting the print job).

In particular, if the print job size is comparatively large and the number of pages to be printed and output is also large, the user may be required to wait for a comparatively long time, leading to reduced printing efficiency.

In the pull printing system according to the exemplary embodiment of the present invention, in contrast, a user may be required to wait in front of the printer PR1 (PR2) for a shorter period of time. The pull printing system according to the exemplary embodiment of the present invention may also require the time t1 required for converting a print job into data and modifying the data and the time t2 required for transferring the data after the first authentication process. However, the user may not necessarily be in front of the printer PR1 (PR2) during the period corresponding to the time t1 and the time t2.

After the completion of the first authentication process, the printer PR1 (PR2) stops its operation before printing and outputting the print job, and stands by until the second authentication process is started.

After the completion of the second authentication process, printing and output of the print job is started. The user waits in front of the printer PR1 (PR2) only during the time t3 required for the printing and output of the print job.

Therefore, while the time required for the overall printing process is not reduced, the time during which the user may be required to wait in front of a printer may be reduced.

In the image forming system PS1 according to this exemplary embodiment, therefore, the time required for a user who is going to perform a printing process to wait in front of a printer may be reduced, leading to improved printing efficiency.

Next, another exemplary embodiment will be described with reference to FIG. 5.

Figure 5:
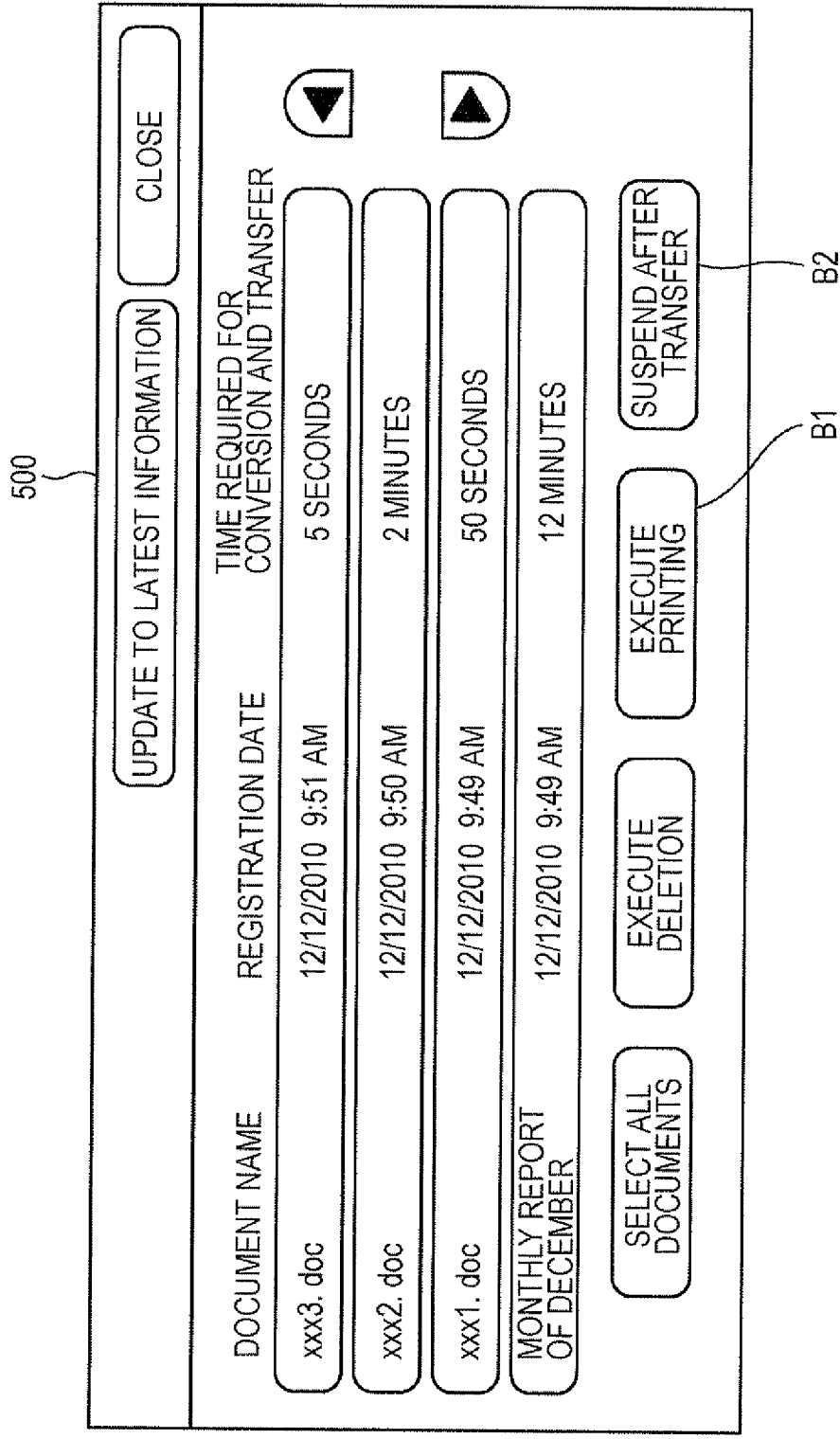
FIG. 5 illustrates an example user interface displayed.

As illustrated in FIG. 5, after the completion of the first authentication process, a job list is displayed on a display panel 500 or the like of the printer PR1 (PR2).

The job list may include information such as the predicted conversion/transfer time, the number of pages of each job, or the data size of each job.

The user selects whether or not the second authentication process is necessary in accordance with the displayed information.

If the user wishes to immediately start printing and outputting a desired print job without performing the second authentication process, the user selects the desired print job and then presses an "execute printing" button B1. Then, the print job is printed and output without performing the second authentication process.

If the user wishes to perform the second authentication process, the user selects a desired print job and then presses a "suspend after transfer" button B2. Then, the print job is printed and output after the completion of the second authentication process described above.

It may be determined whether or not to perform the second authentication process in accordance with a preset threshold.

Therefore, a print job that does not take much time to convert and transfer may be output through single authentication.

Additionally, the approximate time when the second authentication process is to be performed may be found out based on the predicted conversion/transfer time or any other suitable information.

Next, another exemplary embodiment will be described with reference to FIG. 6.

In the illustrated example, by way of example, after the completion of the conversion and transfer processing based on the first authentication process, the print server SA1 or the printer PR1 (PR2) sends an electronic mail to the user with a message such as "The following print job is now going to be output: . . . ".

Therefore, the user may be notified early that the print job will be printed and output by performing the second authentication process, leading to increased printing efficiency.

Figure 7:
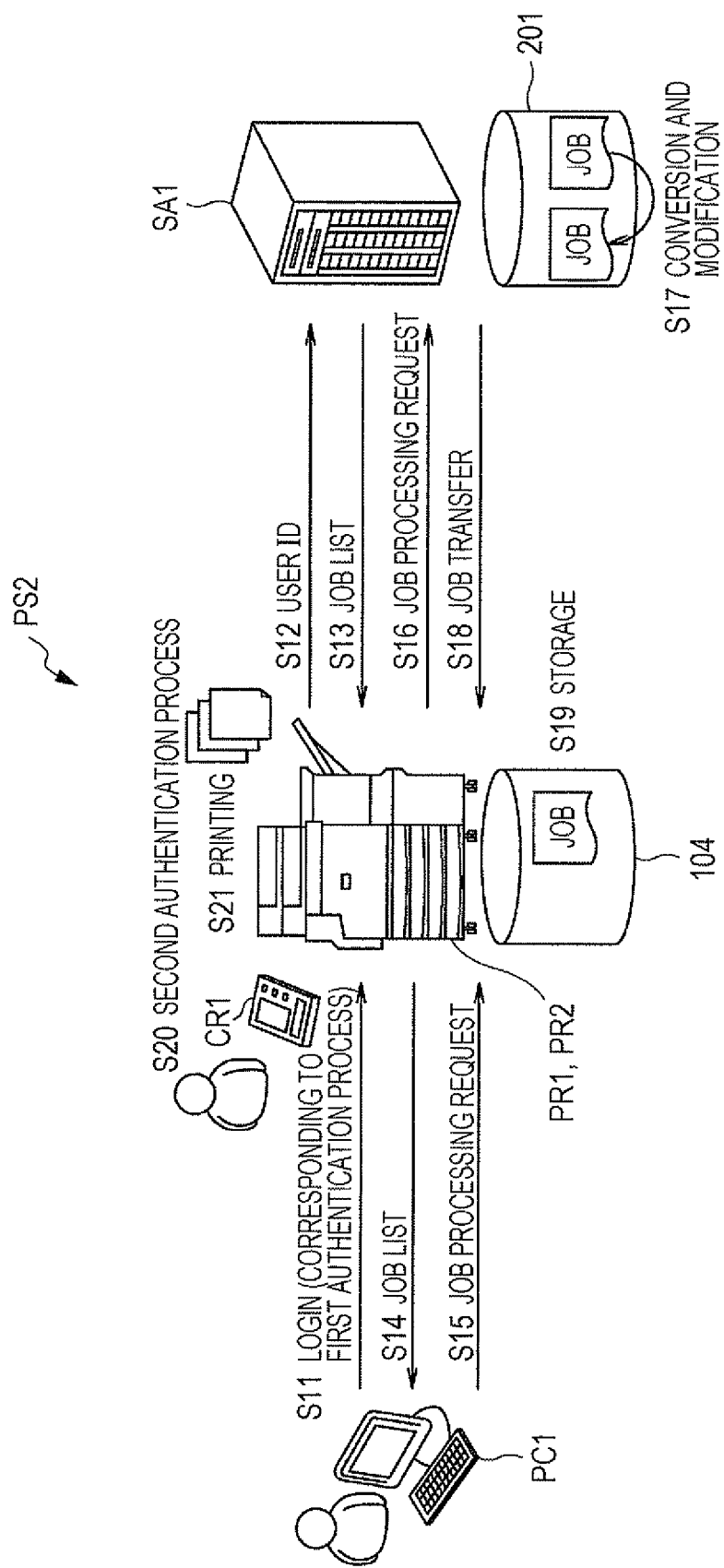
FIG. 7 illustrates the operation of an image forming system according to another exemplary embodiment.

Next, the operation of an image forming system PS2 according to another exemplary embodiment will be described with reference to FIG. 7.

In the illustrated example, a user accesses the printer PR1 (PR2) from a terminal (personal computer PC1) or the like on the user's desk or from a mobile terminal to perform the first authentication process.

That is, the user logs in (step S11) (corresponding to the first authentication process) to the printer PR1 (PR2) using the personal computer PC1 or the like, and sends a user ID to the print server SA1 (step S12).

Then, a job list is sent from the print server SA1 to the printer PR1 (PR2) (step S13), and the job list is sent from the printer PR1 (PR2) to the personal computer PC1 or the like (step S14).

Then, the user operates the personal computer PC1 to send a job processing request for processing a desired print job to the printer PR1 (PR2) (step S15), and the job processing request is transferred to the print server SA1 (step S16).

Then, the print server SA1 performs a print data conversion and modification process (step S17), and print data obtained after the print data conversion and modification process is stored in the print data memory 104 of the printer PR1 (PR2) (step S19).

Then, the user goes to the printer PR1 (PR2). Then, the IC card reader CR1 reads information about the IC card owned by the user, and the second authentication unit 100b performs the second authentication process (step S20).

If the second authentication process has been successful, the printer PR1 (PR2) starts printing and outputting the authentication job of the authenticated user, which is stored in the print data memory 104 (step S21).

Therefore the user may be required to go to the printer PR1 (PR2) only once. This may lead to a reduction in the time required for the user to wait in front of a printer to perform a printing process, resulting in improved printing efficiency.

The authentication based on access from the personal computer PC1 or the like may be performed using an authentication mechanism that is the same as or substantially the same as that of the printer PR1 (PR2) (the same or substantially the same IC card or the same or substantially the same IC card-equipped mobile terminal).

Figure 8:
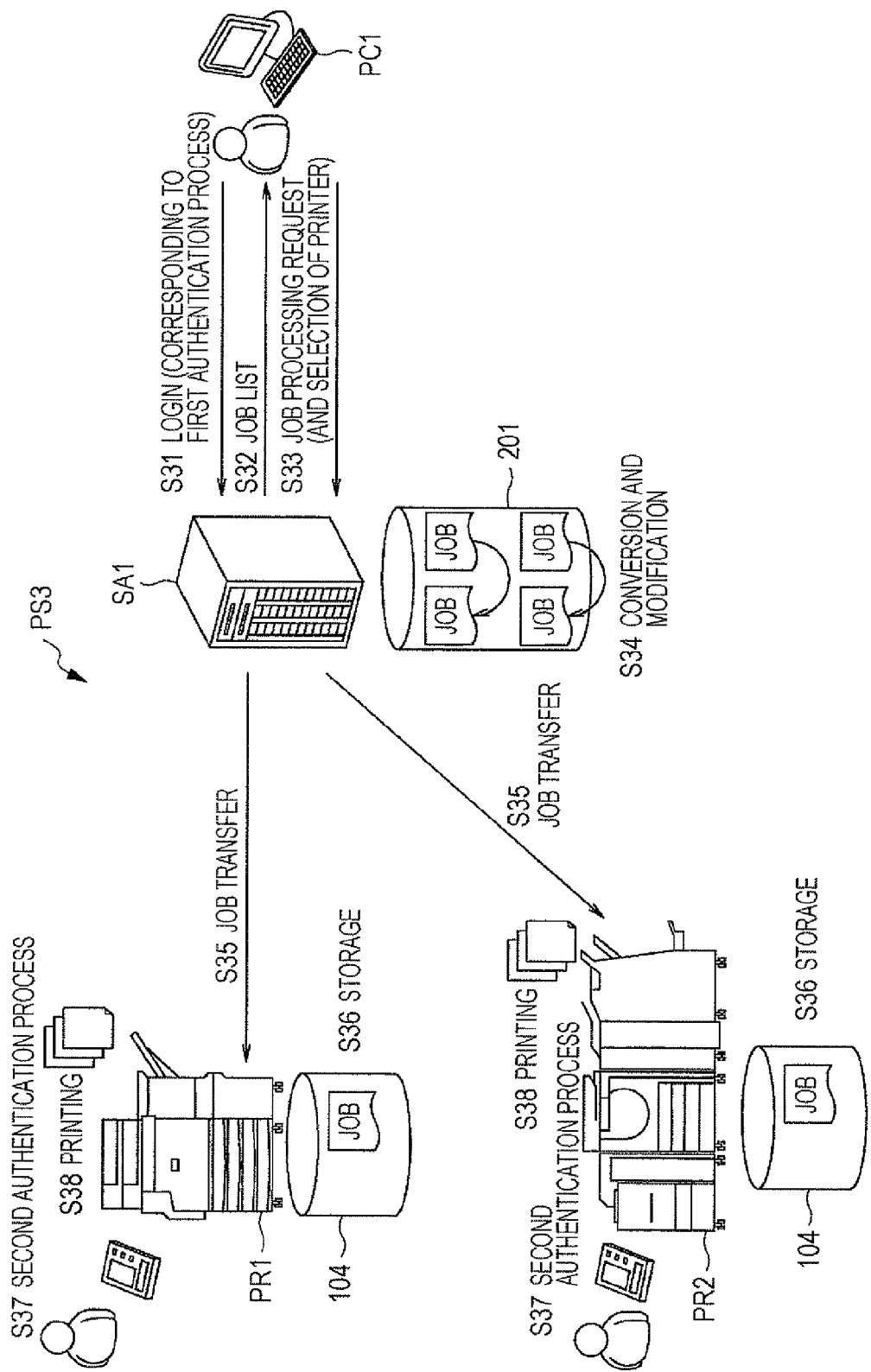
FIG. 8 illustrates the operation of an image forming system according to another exemplary embodiment.

Next, the operation of an image forming system PS3 according to another exemplary embodiment will be described with reference to FIG. 8.

In the illustrated example, a user accesses the printer PR1 (PR2) from a terminal (personal computer PC1) or the like on the user's desk or from a mobile terminal to perform the first authentication process. When selecting a desired job from a job list, the user also selects the printer PR1 or PR2 to print the desired job.

That is, the user logs in (step S31) (corresponding to the first authentication process) to the printer PR1 (PR2) using the personal computer PC1 or the like, and sends a user ID to the print server SA1 (step S12).

Then, a job list is sent from the print server SA1 to the personal computer PC1 (step S32).

Then, the user operates the personal computer PC1 to send a job processing request for processing a desired print job and a selected printer (in this exemplary embodiment, the printer PR1 or PR2) to the print server SA1 (step S33).

Then, the print server SA1 converts and modifies the print data in accordance with the selected printer (step S34).

Subsequently, the print job (print data) is transferred to the selected printer PR1 or PR2 (step S35), and is stored in the print data memory 104 (step S36).

Then, the user goes to the selected printer PR1 or PR2. Then, the IC card reader CR1 reads information about the IC card owned by the user, and the second authentication unit 100b performs the second authentication process (step S37).

If the second authentication process has been successful, the printer PR1 or PR2 starts printing and outputting the authentication job of the authenticated user, which is stored in the print data memory 104 (step S38).

Therefore, the user may be required to go to the printer PR1 (PR2) only once. This may lead to a reduction in the time required for the user to wait in front of a printer to perform a printing process, resulting in improved printing efficiency.

Furthermore, print jobs may be distributed to the plural printers PR1 and PR2, resulting in further improved printing efficiency.

The authentication based on access from the personal computer PC1 or the like may be performed using an authentication mechanism that is the same as or substantially the same as that of the printer PR1 (PR2) (the same or substantially the same IC card or the same or substantially the same IC card-equipped mobile terminal).

Figure 9:
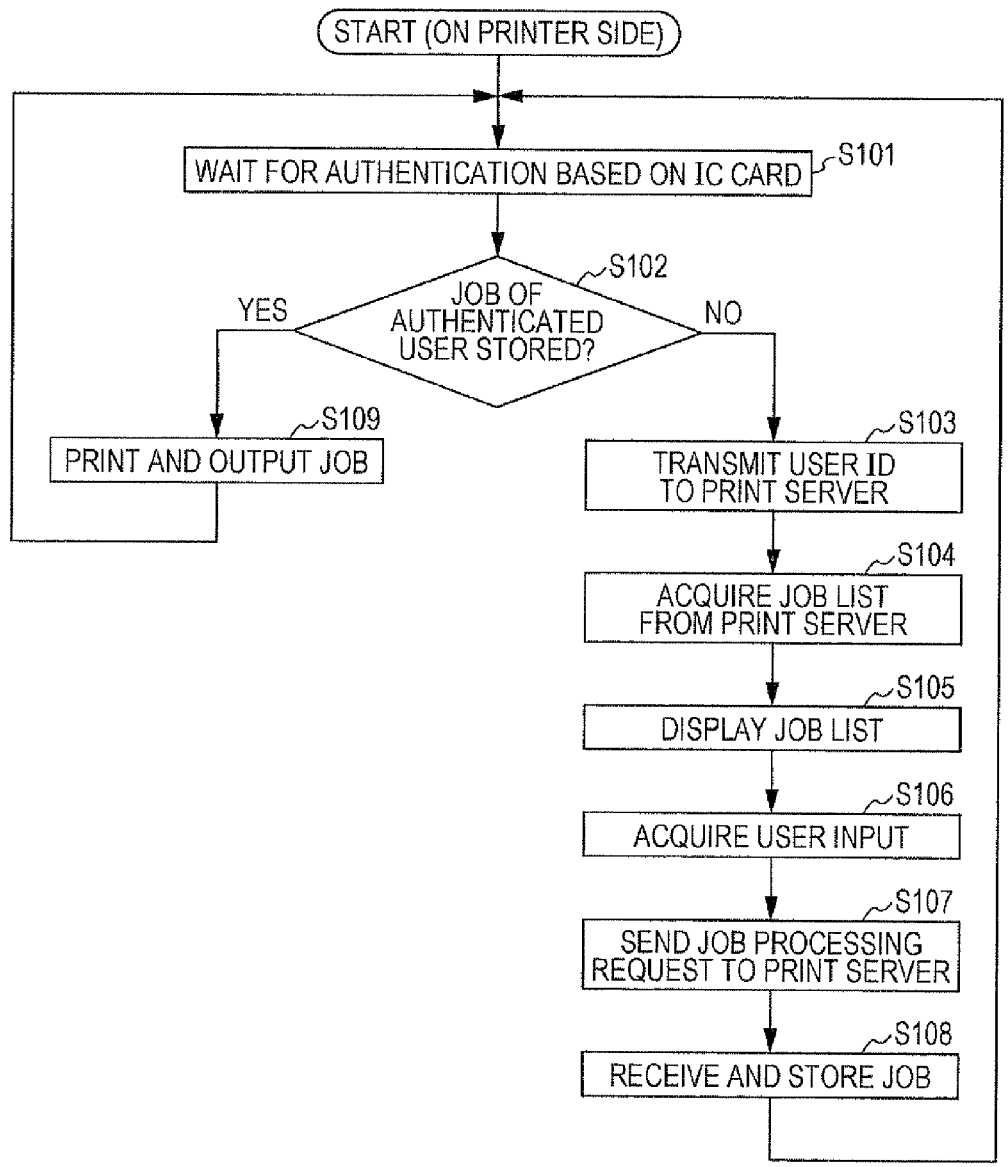
FIG. 9 is a flowchart illustrating a processing procedure of a printing process performed on the printer side.
Figure 10:
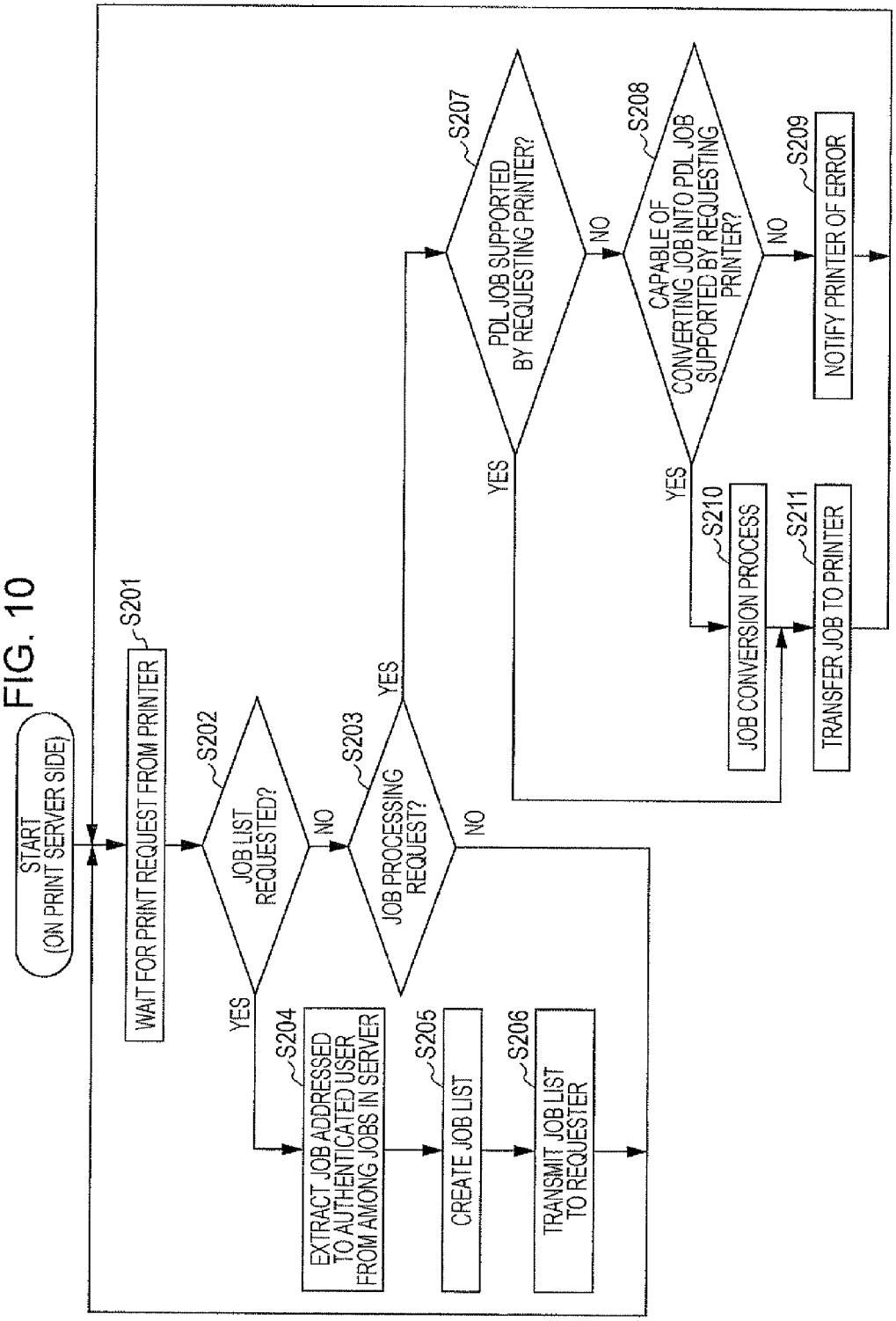
FIG. 10 is a flowchart illustrating a processing procedure of a printing process performed on the print server side.

Next, a processing procedure of a printing process executed by the image forming system PS1 (PS2, PS3) according to this exemplary embodiment will be described with reference to flowcharts of FIGS. 9 and 10.

First, an example of the processing procedure of the printing process executed on the printer PR1 (PR2) side will be described with reference to the flowchart of FIG. 9.

In step S101, the printer PR1 (PR2) waits for the IC card reader CR1 to perform authentication based on an IC card. When authentication is performed, the process proceeds to step S102.

In step S102, it is determined whether or not the print data memory 104 stores a job of the authenticated user. If "NO" is determined, it is determined that the first authentication process has been performed, and the process proceeds to step S103.

In step S103, a user ID is transmitted to the print server SA1. Then, the process proceeds to step S104. In step S104, a job list is acquired from the print server SA1. Then, the process proceeds to step S105.

In step S105, the job list is displayed on a display monitor or the like. In step S106, a user input for, for example, selecting a job is acquired. Then, the process proceeds to step S107.

In step S107, a job processing request is transmitted to the print server SA1. Then, the process proceeds to step S108. In step S108, the print job transmitted from the print server SA1 is received and stored. Then, the process returns to step S101.

If "YES" is determined in step S102, it is determined that the second authentication process has been performed. Then, the process proceeds to step S109. In step S109, a printing process is started. After that, the process returns to step S101.

Next, the processing procedure of the printing process executed on the print server SA1 side will be described with reference to the flowchart of FIG. 10.

In step S201, the print server SA1 waits for a print request from the printer PR1 (PR2). If a print request has been received, in step S202, it is determined whether or not a job list has been requested.

If "YES" is determined, the process proceeds to step S204. In step S204, a print job addressed to the authenticated user is extracted from among the jobs in the print server SA1. Then, the process proceeds to step S205.

In step S205, a job list is created. Then, the process proceeds to step S206. In step S206, the job list is transmitted to the requesting printer. Then, the process returns to step S201.

If "NO" is determined in step S202, the process proceeds to step S203.

In step S203, it is determined whether or not a job processing request has been received. If "NO" is determined, the process returns to step S201. If "YES" is determined, the process proceeds to step S207.

In step S207, it is determined whether or not the corresponding print job is a PDL print job supported by the requesting printer. If "YES" is determined, the process proceeds to step S211. In step S211, the print job is transferred to the printer. Then, the process returns to step S201.

If "NO" is determined, the process proceeds to step S208. In step S208, it is determined whether or not the print server SA1 is capable of converting the corresponding print job into a PDL print job supported by the requesting printer. If "YES" is determined, the process proceeds to step S210. In step S210, the print server SA1 executes a print job conversion process. Then, the process proceeds to step S211.

If "NO" is determined, the process proceeds to step S209. In step S209, the printer is notified of an error. Then, the process returns to step S201.

As described above, the image forming system PS1, PS2, or PS3 according to this exemplary embodiment may reduce the time required for a user who is going to perform a printing process to wait in front of a printer, and may improve printing efficiency.

While the invention made by the inventors has been described in detail with reference to exemplary embodiments thereof, it is to be understood that the exemplary embodiments disclosed herein are merely illustrative in any sense and are not intended to be limited to the technology disclosed herein. That is, the technical range of the present invention is not to be construed in a limiting sense based on the foregoing description of the exemplary embodiments, but should be construed in accordance with the appended claims. Any technology equivalent to that described in the appended claims and any changes made to the appended claims may fall within the scope of the invention.

For example, a print server may be used at least including a first authentication unit that performs authentication for a printing process regarding print information acquired from the network N to determine whether or not to allow processing before printing and outputting the print information on a recording medium using a printer connected to the network N, and a second authentication unit that performs authentication for the printing process regarding the print information, after the completion of the authentication performed by the first authentication unit, to determine whether or not to allow printing and outputting of the print information on a recording medium using the printer.

Furthermore, a program may be provided via a network or may be stored in a recording medium such as a compact disc read-only memory (CD-ROM).

A given program including an image processing program may not necessarily be recorded on a storage device such as a hard disk serving as a recording medium, and may also be provided in the following manner.

For example, the given program may be stored in a ROM, and a central processing unit (CPU) may load the given program into a main memory and execute the given program.

The given program may also be stored in a computer-readable recording medium such as a digital versatile disc read-only memory (DVD-ROM), a CD-ROM, magneto-optical (MO) disk, or a flexible disk and may be distributed.

An image forming apparatus, or any other similar apparatus, may be connected to a server device or a host computer via a communication line (for example, the Internet), and may download the given program from the server device or the host computer and then execute the given program. In this case, the given program may be downloaded to a memory such as a random access memory (RAM) or to a storage device (recording medium) such as a hard disk.

An image forming system, an information management server, and a computer readable medium storing a processing program according to exemplary embodiments of the present invention may be used in a high-speed printer, a multi-function machine, or any other suitable apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   an information management unit that stores and manages print information;
   a determining unit that determines whether or not execution of a printing process regarding the print information is allowed; and
   at least one image forming unit, each image forming unit being configured to print and output print information acquired from the information management unit via a communication unit on a recording medium in accordance with a determination result of the determining unit,
   the determining unit including
      a first authenticating unit that performs authentication for the printing process regarding the print information to determine whether or not execution of modification processing for modifying the print information by adding print commands to the print information before printing and outputting the print information on a recording medium using an image forming unit among the at least one image forming unit is allowed," and
      a second authenticating unit that performs authentication for the printing process regarding the print information, after completion of the authentication performed by the first authenticating unit, to determine whether or not printing and output of the print information on the recording medium using the image forming unit is allowed.

2. The image forming system according to claim 1, wherein each of the at least one image forming unit includes at least one of the first authenticating unit and the second authenticating unit.

3. The image forming system according to claim 1, wherein the processing before printing and outputting the print information on a recording medium using an image forming unit among the at least one image forming unit includes at least one of a conversion process for converting the print information in accordance with specifications of the image forming unit, a modification process for modifying the print information, and a transfer process for transferring the print information from the information management unit to the image forming unit via the communication unit.

4. The image forming system according to claim 2, wherein the processing before printing and outputting the print information on a recording medium using an image forming unit among the at least one image forming unit includes at least one of a conversion process for converting the print information in accordance with specifications of the image forming unit, a modification process for modifying the print information, and a transfer process for transferring the print information from the information management unit to the image forming unit via the communication unit.

5. The image forming system according to claim 3, wherein the image forming unit includes a memory that stores the print information that has been subjected to the processing before printing and outputting the print information on a recording medium.

6. The image forming system according to claim 4, wherein the image forming unit includes a memory that stores the print information that has been subjected to the processing before printing and outputting the print information on a recording medium.

7. The image forming system according to claim 1, further comprising an information processing apparatus connected to at least the information management unit via the communication unit,
   wherein if the information management unit stores and manages a plurality of pieces of print information, the information management unit transmits information regarding each of the plurality of pieces of print information to the information processing apparatus via the communication unit, and
   wherein the information processing apparatus selects whether or not the authentication performed by the second authenticating unit is to be performed in accordance with information regarding each piece of print information.

8. The image forming system according to claim 1, further comprising an information processing apparatus connected to at least the information management unit via the communication unit,
   wherein if the information management unit stores and manages a plurality of pieces of print information, the information management unit transmits list information regarding the plurality of pieces of print information to the information processing apparatus via the communication unit, and wherein the information processing apparatus selects a piece of print information requested to be printed and an image forming unit that prints the piece of print information among the at least one image forming unit in accordance with the list information, and notifies the information management unit of the selected piece of print information and the selected image forming unit via the communication unit.

9. The image forming system according to claim 1, further comprising a notifying unit that provides notification of waiting for the print information to be printed and output when the authentication performed by the first authenticating unit is completed.

10. An information management server comprising:

a first authenticating unit that performs authentication for a printing process regarding print information acquired via a communication unit to determine whether or not execution of modification processing for modifying the print information by adding print commands to the print information before printing and outputting the print information on a recording medium using an image forming unit connected via the communication unit is allowed; and a second authenticating unit that performs authentication for the printing process regarding the print information, after completion of the authentication performed by the first authenticating unit, to determine whether or not printing and output of the print information on the recording medium using the image forming unit is allowed.

11. A non-transitory computer readable medium storing a program causing a computer to execute a process for performing processing, the process comprising:

performing a first authentication process for a printing process regarding print information to determine whether or not execution of modification processing for modifying the print information by adding print commands to the print information before printing and outputting the print information on a recording medium using an image forming unit is allowed;

performing a second authentication process for the printing process regarding the print information, after completion of the first authentication process, to determine whether or not printing and output of the print information on the recording medium using the image forming unit is allowed; and printing and outputting the print information using the image forming unit when the second authentication process is completed.

12. An image forming system comprising:

a print server that stores and manages print information;

at least one printer, each printer being configured to print and output print information acquired from the print server via a communication unit on a recording medium; and an information processing apparatus connected to the print server and the at least one printer via the communication unit, the print server including an information management unit that stores and manages print information, each of the at least one printer including a determining unit that determines whether or not execution of a printing process regarding the print information is allowed, and an image forming unit that prints and outputs print information acquired from the information management unit via the communication unit on a recording medium in accordance with a determination result of the determining unit, the determining unit including a first authenticating unit that performs authentication for the printing process regarding the print information to determine whether or not execution of processing before printing and outputting the print information on a recording medium using an image forming unit among the at least one image forming unit is allowed, and a second authenticating unit that performs authentication for the printing process regarding the print information, after completion of the authentication performed by the first authenticating unit, to determine whether or not printing and output of the print information on the recording medium using the image forming unit is allowed.

* * * * *